US008107803B1

(12) United States Patent
Hannah et al.

(10) Patent No.: US 8,107,803 B1
(45) Date of Patent: Jan. 31, 2012

(54) NON-SCALING FLOW THROUGH WATER HEATER

(75) Inventors: Gary Ray Hannah, Shawnee, KS (US); Richard William Heim, Shawnee, KS (US)

(73) Assignees: Richard W. Heim, Shawnee, KS (US); Gary R. Hannah, Shawnee, KS (US)

( * ) Notice: Subject to any disclaimer, the term of this patent is extended or adjusted under 35 U.S.C. 154(b) by 961 days.

(21) Appl. No.: 12/102,826

(22) Filed: Apr. 14, 2008

Related U.S. Application Data

(60) Provisional application No. 60/912,162, filed on Apr. 16, 2007.

(51) Int. Cl.
*F24H 1/10* (2006.01)
*H05B 3/78* (2006.01)

(52) U.S. Cl. ........ 392/494; 392/437; 392/432; 392/445; 392/465; 392/485

(58) Field of Classification Search .................. None
See application file for complete search history.

(56) References Cited

U.S. PATENT DOCUMENTS

| | | | | |
|---|---|---|---|---|
| 4,262,585 A | | 4/1981 | Leuschner | |
| 4,334,141 A | * | 6/1982 | Roller et al. | 392/467 |
| 4,371,777 A | * | 2/1983 | Roller et al. | 392/480 |
| 4,455,475 A | * | 6/1984 | Giorgetti | 392/494 |
| 4,567,350 A | * | 1/1986 | Todd, Jr. | 392/486 |
| 4,601,263 A | * | 7/1986 | Shieh | 122/14.3 |
| 4,757,754 A | | 7/1988 | Welker | |
| 4,808,793 A | * | 2/1989 | Hurko | 392/489 |
| 4,949,627 A | | 8/1990 | Nordskog | |
| 4,994,641 A | | 2/1991 | Schiebelhuth | |
| 5,027,425 A | | 6/1991 | Slomka | |
| 5,129,034 A | * | 7/1992 | Sydenstricker | 392/486 |
| 5,216,743 A | * | 6/1993 | Seitz | 392/490 |
| 5,283,854 A | | 2/1994 | Schiebelhuth | |
| 5,408,578 A | * | 4/1995 | Bolivar | 392/490 |
| 5,892,887 A | * | 4/1999 | Thomas et al. | 392/490 |
| 5,953,981 A | | 9/1999 | Lassota | |
| 6,227,101 B1 | | 5/2001 | Rabadi | |
| 6,246,831 B1 | * | 6/2001 | Seitz et al. | 392/486 |
| 6,389,226 B1 | * | 5/2002 | Neale et al. | 392/485 |
| 6,539,173 B2 | * | 3/2003 | Chu | 392/486 |
| 6,600,875 B2 | | 7/2003 | Kodden | |
| 6,701,069 B1 | * | 3/2004 | Cezayirli et al. | 392/490 |
| 6,779,435 B1 | | 8/2004 | Iacobucci | |
| 7,017,408 B2 | | 3/2006 | Ramus | |
| 7,046,922 B1 | * | 5/2006 | Sturm et al. | 392/482 |
| 7,190,890 B2 | * | 3/2007 | Higham et al. | 392/473 |
| 7,190,894 B2 | * | 3/2007 | Chamberlain, Jr. | 392/490 |
| 7,210,400 B2 | | 5/2007 | Kaminishi | |
| 7,822,326 B2 | * | 10/2010 | Commette et al. | 392/484 |
| 7,920,779 B2 | * | 4/2011 | Shirai et al. | 392/474 |
| 2011/0013893 A1 | * | 1/2011 | Fabrizio | 392/465 |

* cited by examiner

*Primary Examiner* — Thor Campbell

(57) ABSTRACT

A water heating apparatus for a beverage brewing device. Water is heated to brew temperature without boiling or localized boiling, thereby minimizing the precipitating of scale. The heating elements each have a low watt density, thereby increasing safety. Multiple heating zones allow the use of a plurality of power relays, lowering the power per relay and thus improving the reliability of the relays. The heating elements cannot overheat due to a failure resulting in a lack of water in the apparatus since the temperature sensors are mounted directly on each heating element, allowing direct measurement and control of each heating element. Precise control of water temperature in the apparatus is provided by varying both the water flow rate through the heating apparatus, and by varying heating element temperatures.

3 Claims, 5 Drawing Sheets

NON-SCALING FLOW THROUGH WATER HEATER

CROSS-REFERENCE TO RELATED APPLICATIONS

This application claims benefit of provisional patent application Ser. No. 60/912,162, filed Apr. 16, 2007 by the present inventors.

FEDERALLY SPONSORED RESEARCH

Not Applicable

SEQUENCE LISTING OR PROGRAM

Not Applicable

BACKGROUND

Field of Invention

This invention relates to water heating devices, specifically to such devices used to brew beverages.

BACKGROUND

Prior Art

Coffee makers on aircraft are used many times per month and therefore must be very reliable. The current art, U.S. Pat. No. 6,227,101, heats water in a reservoir with heating elements having small surface areas. The small surface areas require the heating elements to reach a temperature significantly above the boiling point of water in order to raise the reservoir water to a brew temperature in a given time. Water that is in direct contact with the high temperature heating elements boils, referred to as localized boiling. Localized boiling is characterized by the incipience and growth of bubbles on a heated surface, which arise from discrete points on the surface. In general, the number of nucleation sites for bubbles to form increases with the surface temperature. Aircraft obtain water for onboard use from local sources. Much of this water is "hard water", which when boiled, causes "scale" to precipitate, most likely calcium carbonate. The scale causes several reliability problems with the current art. Specifically, scale deposits clog valves, reduces heat conduction, and gives the brewed beverage an undesirable flavor. Another problem with the current art, U.S. Pat. No. 6,227,101, in using heating elements that reach high temperature is reduced reliability of the heating elements and electrical relays. These heating elements cycle on and off while heating batches of water and while keeping the water in the reservoir at brew temperature. The continued high temperature cycling of the heating elements causes the elements to fatigue, causing cracks to develop in the heating elements. Water gets into the cracks and eventually causes the heating element to fail. The current art, U.S. Pat. No. 6,227,101, controls the temperature of the heating elements with temperature sensors that are not mounted directly on the heating elements, since these elements reach very high temperatures. The temperature sensors measure the temperature of the water in the reservoir. If a failure occurs with the current art, such as the "water level sensing means" failing, the device will try to heat water in the reservoir when the reservoir has no water. This causes the heating elements to reach a maximum temperature, and if water is introduced to the reservoir at this time, it could cause the water to flash to steam and high pressure. The quenching of the hot heating elements with cold water also causes cracks in the heating elements. Over time this cause failure of the heating elements. The current art, U.S. Pat. No. 6,227,101 and U.S. Pat. No. 6,779,435, only use three heating elements, each element being controlled through a relay. This requires each relay to handle a large amount of power. The current art, U.S. Pat. No. 6,779,435, heats water very rapidly with up to three heating elements, or "resistors", each providing 800 W-1000 W of power to a small surface area of water travelling in shallow grooves, or "coils". There is not a capability to gradually raise the water temperature with heated surfaces at temperatures lower than the boiling point of water. The current art will cause localized boiling and therefore scaling. Therefore, the current art, U.S. Pat. No. 6,779,435, requires the use of an ion-fractionation filter at the point of water intake to prevent deposition of lime. Similarly, the current art of U.S. Pat. No. 4,949,627 uses three heating elements, each providing approximately 900 W each. This configuration will also cause localized boiling and therefore buildup of scale. In this case the scale will clog the small diameter "connection tubes" and accumulate in the heater tubes around the heating elements. As with other current art, U.S. Pat. No. 4,949,627 relies on temperature sensors not located directly on the heating elements. This relies on a "water level sensor" to detect the absence of water to prevent overheating the heating elements when no water is present. If the "water level sensor" fails the heating elements will operate in a dry state. The temperature sensors will not directly detect the heating elements temperature, since they depend on measuring water temperature. Overheating of the elements without water can cause failure.

SUMMARY

The present invention comprises a continuous flow water heater assembly that gradually heats water to a brew temperature without localized boiling and thereby reduces scaling. The reduced scaling improves the reliability of a brewing device, such as a coffee maker. Scaling tends to clog valves and reduces the heat conduction to the water being heated and gives the brewed beverage an undesirable flavor. This requires airlines to spend much effort in maintenance of coffee makers. Reliability of the heater is also increased through the redundant use of heater pads. In one embodiment, the present invention uses six heating elements, each with a separate relay. Thus, the total power is divided among six relays, increasing the life of the relays. If one heater pad fails, the other pads will continue to function and still be able to heat the water to the target temperature. The heater pads will simply not cycle off as often and they will reach temperatures closer to the predetermined maximum temperature. Additionally, flow rate is automatically adjusted to cause the water to achieve the target temperature at the exit of the heater assembly. A variable valve, either a self regulating thermostatic valve or an electronically controlled valve, opens and closes to vary the flow rate through the heater assembly. This valve varies how long the water is exposed to the heating elements and thereby affects the water temperature exiting the heater assembly. Thermocouples are located directly on the heating elements allowing the temperature of the heating elements to be controlled directly, even if there is no water present due to a failure.

DRAWINGS

Figures

DRAWINGS

Figure 1:
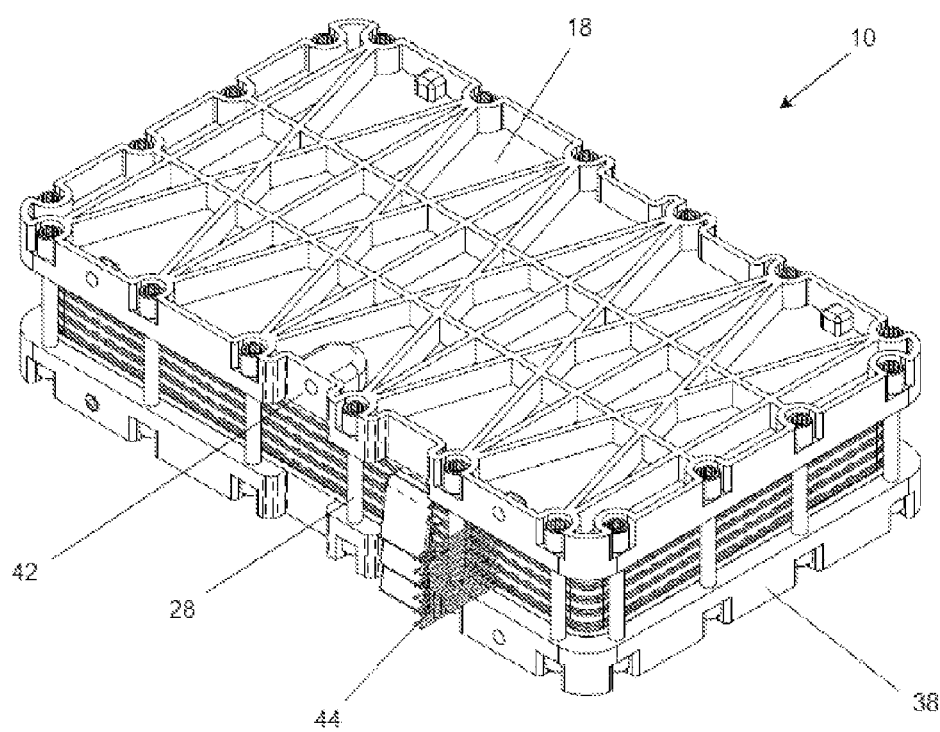
FIG. 1 shows the heater assembly.

Reference Numerals 10 heater assembly
12 water jacket
14 heater pad
16 thermocouple
18 top plate
20 jacket plate
22 heater pad hole
24 jacket plate hole
26 water guide
28 fastener
30 inlet valve
32 variable valve
34 air valve
36 controller
38 bottom plate
40 inlet
42 outlet
44 wires

DETAILED DESCRIPTION

Figure 2:
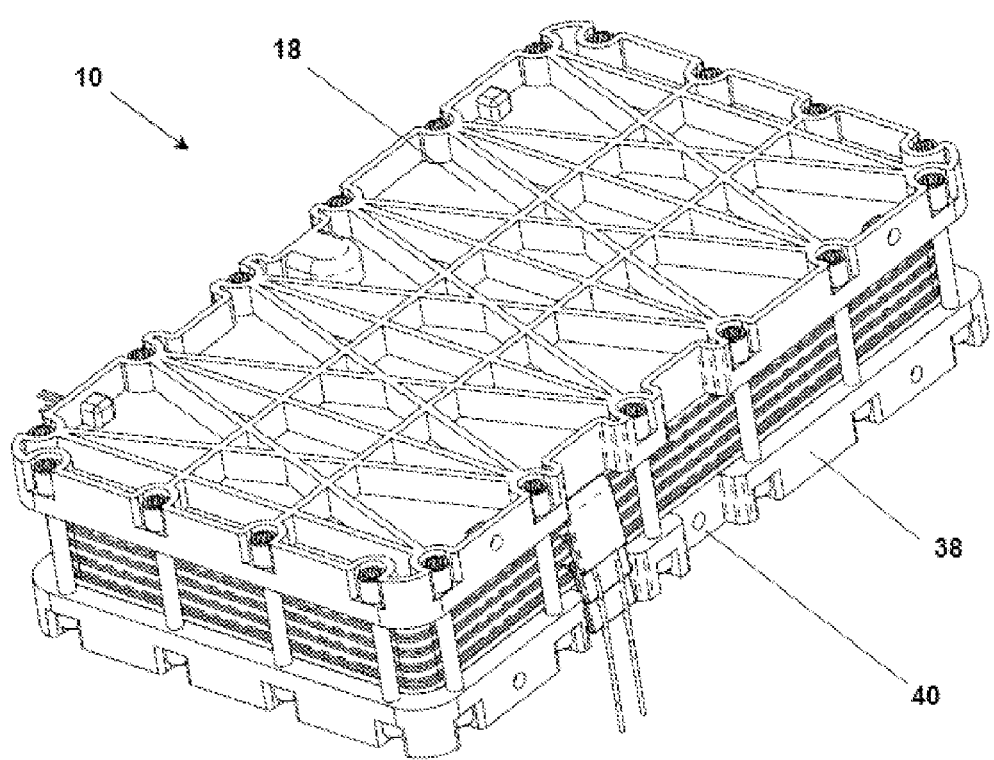
FIG. 2 shows another view of the heater assembly.
Figure 3:
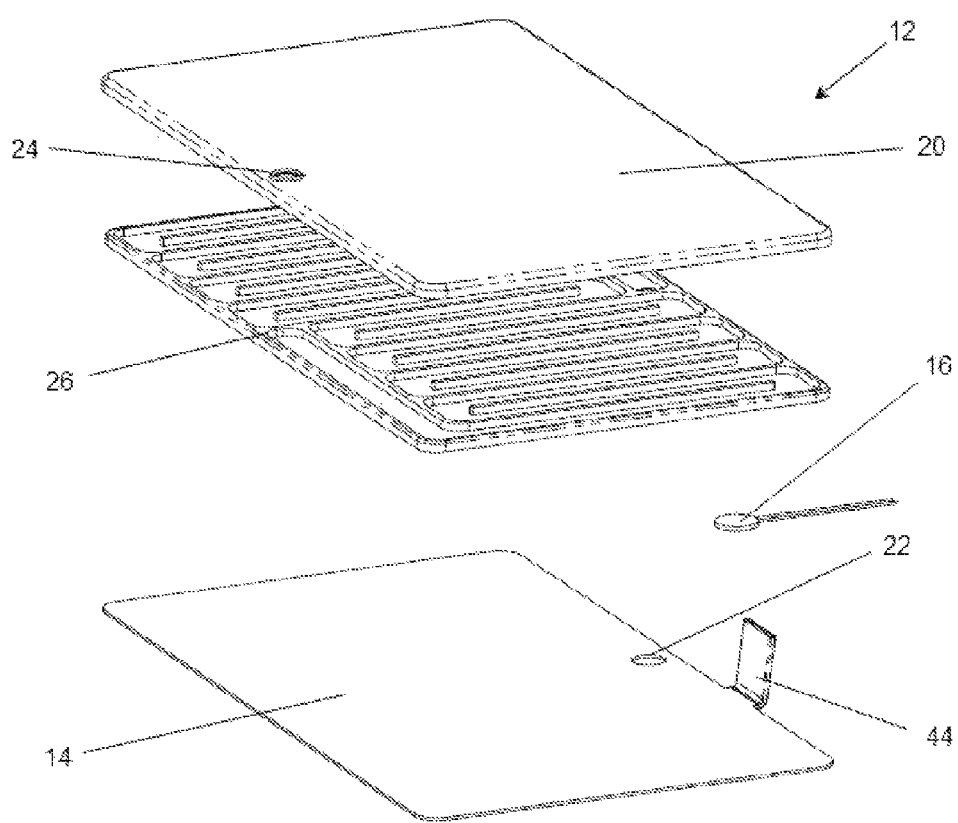
FIG. 3 shows a water jacket.
Figure 4:
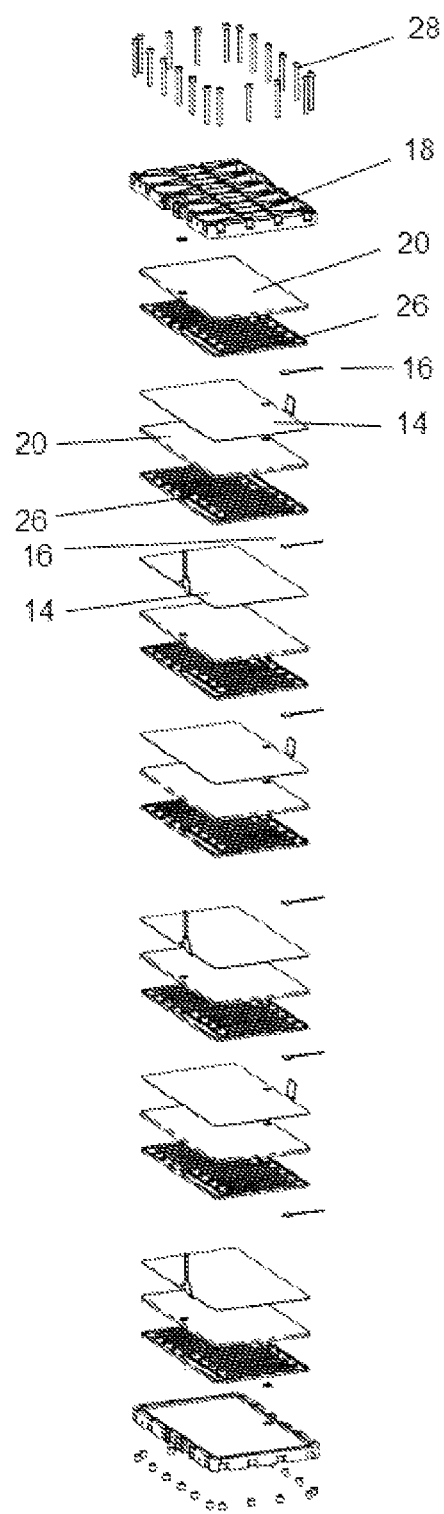
FIG. 4 shows an exploded view of the heater assembly.
Figure 5:
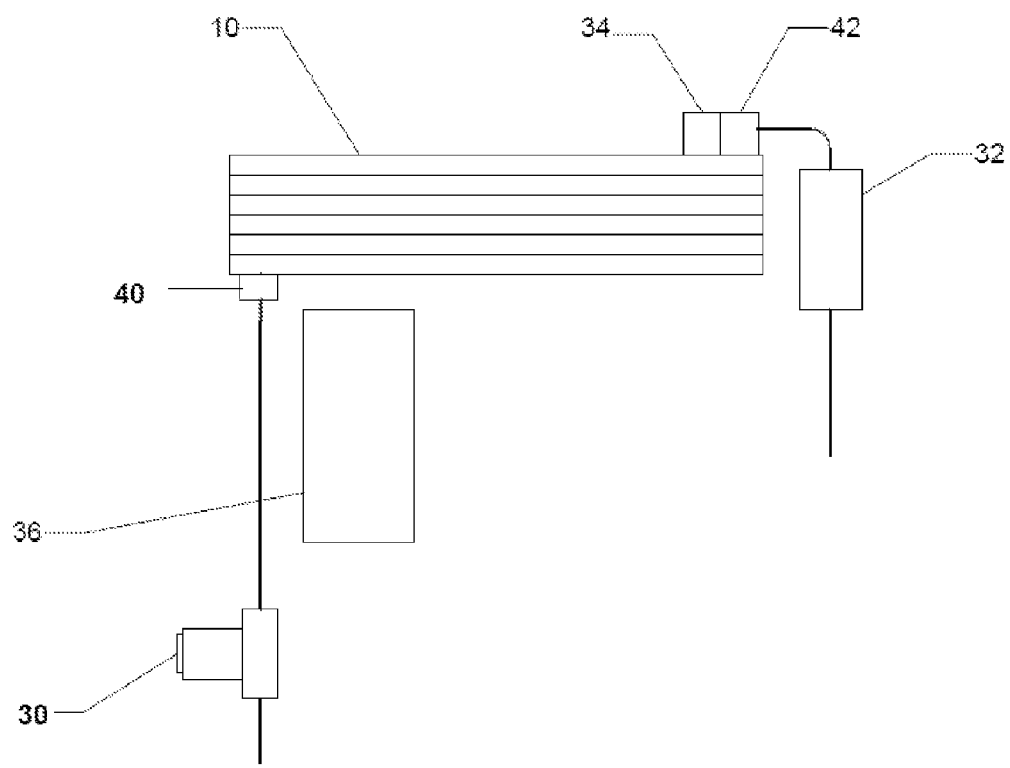
FIG. 5 shows the heater assembly with other required components.

The present invention provides for an apparatus that gradually raises water temperature as it flows through a heater assembly. Thermocouples monitor the temperature at multiple points to ensure the water does not reach a boiling point or cause any localized boiling. The heater assembly 10 illustrated in FIGS. 1-4 is comprised of a stack of water jackets 12. Each water jacket 12 is comprised of a heater pad 14, a thermocouple 16, a jacket plate 20, and a water guide 26. As shown in FIG. 3, the water jackets 12 are assembled by sandwiching the water guide 26 between jacket plate 20 and heater pad 14. Thermocouple 16 is attached to heater pad 14. Referring to FIG. 4, water jackets 12 are stacked so that heater pad hole 22 and jacket plate hole 24 are on opposite sides of water guide 26. This allows water to enter water jacket 12 through heater pad hole 22, travel along water guide 26, and then exit through jacket plate hole 24. Water leaves one water jacket 12 and enters the next water jacket 12 through jacket plate hole aligning 20 with heater pad hole 22. The stack of water jackets 12 are compressed together and secured with top plate 18, bottom plate 38, and fasteners 28. Water enters the heater assembly 10 through inlet 40 as shown in FIG. 2. Heated water exits heater assembly 10 through outlet 42 as shown in FIG. 1. Power is supplied to heater pads 14 through wires 44. FIG. 5 illustrates how a variable valve 32 is attached to the outlet 42 of the heater assembly 10. The variable valve 32 opens and closes gradually based on temperature of the water exiting the heater assembly 10.

Operation

Referring to FIG. 5, a controller 36 sends power to the heater pads 14 raising the temperature to a predetermined value. Simultaneously, controller 36 opens inlet valve 30 filling the heater assembly 10 with water through inlet 40. Air valve 34 bleeds off air present in heater assembly 10. Water flows along water guides 26 within water jackets 12. Water flows between water jackets 12 through heater pad holes 22 and jacket plate holes 24. Heated water exits the heater assembly 10 through outlet 42. The controller 36 monitors the temperature of each heater pad 14 via the thermocouples 16. Power to each heater pad 14 is cycled on and off by controller 36 to keep each heater pad 14 temperature within a predetermined range. Variable valve 32 at outlet 42 of the heater assembly 10 gradually opens as the water at outlet 42 reaches a predetermined minimum brew temperature. When the water temperature at outlet 42 reaches a predetermined maximum value, the variable valve 32 is completely open. If the water temperature at outlet 42 is higher than the predetermined maximum, then the controller 36 will turn off some heater pads 14. As the water temperature at outlet 42 decreases, then the variable valve 32 gradually closes. This causes a reduced flow rate through the heater assembly 10 and thereby raises the water temperature at outlet 42. In this manner the water temperature exiting heater assembly 10 is maintained within a predetermined temperature range.

Advantages

From the description above, a number of advantages of some embodiments of our water heater assembly become evident:

a) Reduced scaling deposits due to boiling. The present invention uses large heated surface areas that gradually raise the water temperature to the brew temperature as water flows through the heater assembly. Temperature sensors and a controller monitor each heating element independently, turning them on and off as required, to ensure the water reaches the target temperature but does not reach the boiling point. The large heated surface areas allow the present invention's heating elements, which are heater pads, to have a maximum temperature lower than the current art's heating elements. The continuous flow water heater assembly gradually heats water to the desired temperature as the water flows through water guides. The water guides maximize the heated area the water traverses. This allows the use of a lower maximum temperature for the heating elements. High temperature heating elements with small surface area are replaced with lower temperature heating elements with large surface area. This allows gradual heating of the water to a high temperature without localized boiling and therefore produces much less "scaling".

b) Mounting the temperature sensors directly on the heating elements. In the event of a failure where the system is trying to heat the water jackets when there is no water present, the temperature sensors will still control the heater pad temperatures as intended. It is not necessary for water to be present to measure the heater pad temperatures. The heater pads will simply reach the predetermined maximum temperature, which is near the boiling point of water.

c) Low watt density of heating elements. In one embodiment of the present invention, six heating elements are used, each receiving power through a separate relay. Thus, the total power is divided among six relays instead of three relays supplying three heating elements, as is typically used by the current art. Since the total power of the current art and of the present invention is similar, approximately 3000 watts, then the present invention requires each relay to handle half the power as does the current art. This increases the life of the relays. The low watt density of the heaters also increases the safety of the heater assembly in the event of a failure.

d) Control of water temperature by varying water flow rate through the heater assembly. A variable valve is modulated open and closed based on the water temperature exiting the heater assembly. This allows the system to ensure the water does not reach a temperature above the boiling point of water. The variable valve also ensures the water exiting the heater assembly is at the predetermined brewing temperature. As the temperature of water exiting the heater assembly rises above the minimum brew temperature, the variable valve opens further thereby increasing the water flow rate through the heater assembly. The higher flow rate lowers the water temperature exiting the heater assembly. If the water temperature exiting the heater assembly decreases, then the variable valve gradually closes, thereby reducing the water flow rate and raising the water temperature exiting the heater assembly. In this manner the water temperature exiting the heater assembly can be accurately controlled. This control results in a consistent brewing temperature and reduced scaling due to boiling.

Description and Operation of Alternative Embodiments

The water guide 26 could be made in various s patterns: circular, spiral, etc. Thermocouples 16 could be located in contact with water inside the water jackets 12 rather than on heater pads 14. Heater Pads 14 could be replaced with heaters bonded directly to jacket plate 20. Thermistors could be used to measure temperature of heater pads 14 instead of thermocouples 16. Water jackets 12 could be replaced with coiled conductive tubing that is bent into a spiral in a plane. Each coil could be connected to the next with heater pads 14 in between each flat coil.

Conclusion, Ramifications, and Scope

The reader will see that, according to one embodiment of the invention, we have provided a heater assembly that can reliably heat water to brew temperature and produce a minimum of scaling. While the above description contains many specificities, these should not be construed as limitations on the scope of any embodiment, but as exemplifications of the presently preferred embodiments thereof. Many other variations are possible within the teachings of the various embodiments. Thus the scope of the invention should be determined by the appended claims and their legal equivalents, and not by the examples given.

We claim:

1. An apparatus for heating water comprising:
   (a) a plurality of water jackets, each said water jacket having an input, an output, and a heating element,
   (b) said water jackets being connected in series such that the output of each said water jacket is connected to the input of the next said water jacket in said series and where the output of the last said water jacket in said series provides water heated to a predetermined temperature,
   (c) said plurality of water jackets being stacked such that water flows from one said water jacket to the next said water jacket in said stack,
   (d) temperature sensors to measure water temp and/or heating element temperatures,
   (e) a top plate located on the top of said stack of said water jackets and a bottom plate located on the bottom of said stack of said water jackets, said stack of said water jackets being secured by fasteners connecting said top plate to said bottom plate,
   (f) an inlet in said bottom plate that connects to the first said water jacket in said stack of said water jackets,
   (g) an outlet in said top plate that connects to the last said water jacket in said stack of said water jackets, and
   (h) a variable valve to control the flow rate of water within said apparatus, said valve being located at either an inlet or an outlet of said apparatus, said variable valve being controlled by means based on the water temperature in said apparatus,
   whereby as water flows through each said water jacket the water is gradually heated to a predetermined temperature without reaching the boiling point of water within any said water jacket and the water temperature in said water jackets can be controlled by monitoring said temperature sensors and varying the temperature of said heating elements and/or by varying water flow rate through said apparatus with said variable valve.

2. The apparatus of claim 1 further including water guides within each said water jacket, said water guides being of a geometry to increase the surface area traversed by water flowing within said heated water jackets, whereby the temperature of water exiting any said water jacket is increased for a given flow rate and said heating element temperature due to the large heated surface area traversed within said water jacket.

3. The apparatus of claim 1, wherein said heating elements are low watt density heater pads, whereby water flowing through each said water jacket is heated gradually without localized boiling.

* * * * *

UNITED STATES PATENT AND TRADEMARK OFFICE
CERTIFICATE OF CORRECTION

| | | |
|---|---|---|
| PATENT NO. | : 8,107,803 B1 | Page 1 of 1 |
| APPLICATION NO. | : 12/102826 | |
| DATED | : January 31, 2012 | |
| INVENTOR(S) | : Gary Ray Hannah and Richard William Heim | |

It is certified that error appears in the above-identified patent and that said Letters Patent is hereby corrected as shown below:

The published patent used Figure 4 on the cover page. Figure 4 is not readable on the cover page since the space provided is small. Please replace Figure 4 on the cover page with Figure 1.

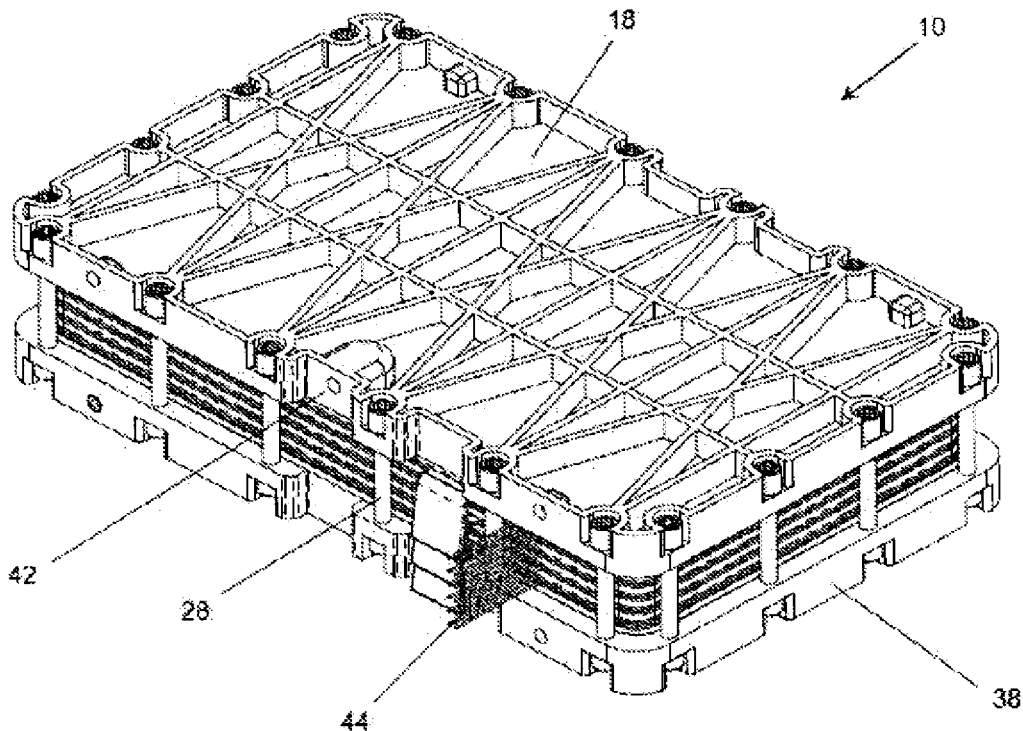

Fig 1

Signed and Sealed this
Tenth Day of April, 2012

David J. Kappos
*Director of the United States Patent and Trademark Office*